United States Patent [19]
Ocel, Jr. et al.

[11] Patent Number: 5,958,256
[45] Date of Patent: Sep. 28, 1999

[54] METHOD FOR PRETREATING AN INDUSTRIAL WASTEWATER

[75] Inventors: William T. Ocel, Jr., The Woodlands; James L. Starr, Jr., Houston; Casimir J. Borowski, The Woodlands; Robert T. Short, III, Spring, all of Tex.

[73] Assignee: Tetra Technologies, Inc., Houston, Tex.

[21] Appl. No.: 08/869,131

[22] Filed: Jun. 4, 1997

[51] Int. Cl.⁶ .................................................. B01D 21/26
[52] U.S. Cl. ........................................... 210/800; 210/806
[58] Field of Search ..................................... 210/806, 800, 210/252, 359, 258, 257.1, 304, 513, 521, 512.1, 512.2, 388

[56] References Cited

U.S. PATENT DOCUMENTS

| | | | |
|---|---|---|---|
| 2,754,968 | 7/1956 | Vegter et al. | 209/211 |
| 3,338,814 | 8/1967 | Given et al. | 208/11 |
| 3,764,008 | 10/1973 | Darley et al. | |
| 4,272,379 | 6/1981 | Pollock | 210/621 |
| 4,571,301 | 2/1986 | Inskeep, Jr. | 210/788 |
| 4,745,096 | 5/1988 | Keough | 502/413 |
| 4,746,421 | 5/1988 | Turbitt | 209/3 |
| 4,839,054 | 6/1989 | Ruebush | 210/639 |
| 5,108,626 | 4/1992 | Lees et al. | 210/785 |
| 5,350,525 | 9/1994 | Shaw et al. | 210/744 |
| 5,422,019 | 6/1995 | Carman | 210/806 X |
| 5,783,096 | 6/1998 | Blaak | 210/806 |

Primary Examiner—W. L. Walker
Assistant Examiner—Terry K. Cecil
Attorney, Agent, or Firm—Jo Katherine D'Ambrosio

[57] ABSTRACT

A method for cleaning industrial wastewater comprising pretreatment of the wastewater stream by intercepting and removing settleable solids prior to subjecting the stream to primary cleaning systems are disclosed. The method of pretreatment comprises pumping wastewater from a collecting reservoir or sewer through a hydrocyclone to separate the stream into an overflow of reduced solids content and an underflow of enhanced solids content. The overflow is directed to a holding tank or forebay of the primary cleaning system. The primary cleaning system comprises a gravity settler, a CPI (corrugated plate interceptor) system or API (American Petroleum Institute) separator for example. The gravity settler is operated to obtain an effluent essentially free of settleable solids and a sludge stream. The underflow with its enhanced solids content is screened to obtain a screened water stream and a sludge of screened solids which is directed to a collection container. The screened water stream continues on to the primary cleaning system.

11 Claims, 2 Drawing Sheets

METHOD FOR PRETREATING AN INDUSTRIAL WASTEWATER

FIELD OF THE INVENTION

The present invention relates to a method and system for cleaning industrial wastewater and, more particularly, to an industrial wastewater cleaning system and method for pretreatment of an industrial wastewater stream comprising the interception and removal of solids from the wastewater prior to subjecting the stream to primary cleaning systems.

BACKGROUND OF THE INVENTION

All industrial operations produce some wastewater which must be returned to the environment. Wastewater treatment is directed toward removal of pollutants with the least effort. Suspended solids are removed by either physical or chemical separation techniques and handled as concentrated solids (sludge). Current physical methods of cleaning wastewater streams rely on gravity separation, CPI (corrugated plate interceptor) systems for example, multiple rake and paddle arrangements such as found in API separators, hydrocyclones and pumps to remove settleable solids and oil. Solid-laden sludge tends to build up and damage equipment in these primary treatment systems. Many of these systems are typically below ground so maintenance is difficult and repairs costly.

Various equipment and systems are known to separate mixtures of solid, oil and water into divergent streams. Vegner, et al., U.S. Pat. No. 2,754,968, disclose the treatment of liquid materials with plural hydrocyclones in series. An apparatus is disclosed that is comprised of first, second and third hydrocyclones, closed communication means between the vortex finder of the first hydrocyclone and the feed entrance of the second hydrocyclone and closed communication means between the apex aperture of the first hydrocyclone and the feed entrance of the third hydrocyclone. Given, et al., U.S. Pat. No. 3,338,814, disclose plural cyclones in parallel to separate solids from liquids. Specifically, '814 discloses the separation of oil from bituminous emulsions containing appreciable quantities of mineral solids. Two-stage cycloning is disclosed for separation of mineral solids encompassing a large range of particle size. Given discusses that if arranged by subsequent processing, greater amounts of solids can be removed to leave less solids in the overflow stream.

Darley, et al., U.S. Pat. No. 3,764,008, disclose a process for recovering oil from produced sand. The well operating process treats fluid produced from a sand productive hydrocarbon recovery well in order to isolate marketable hydrocarbons, a substantially oil-free water and a substantially oil-free sand. Unabsorbed hydrocarbons are removed, sand is partially de-oiled by entraining it in a stream of relatively high speed jet of water, centrifugally separating the resultant sand laden water stream by removing an oily water overflow and a sandy water underflow, and removing the oil from the oily water. In the process, clean water is recycled back into the treatment system.

A method and apparatus for cleaning chemical-containing water solutions to remove impurities from the solution so that the solution can be reused is disclosed in Inskeep, U.S. Pat. No. 4,571,301. The dirty solution is collected in a reservoir and the solution is pumped from the reservoir to a cyclone separator. A conduit from the reservoir to cyclone separator includes a screen for removal of leaves, gravel, etc. The contents of reservoir are screened and pumped into cyclone separator. Underflow from cyclone separator enters a container wherein solids settle out and liquid overflows into pipe and recycle back to reservoir.

Shaw et al., U.S. Pat. No. 5,350,525, disclose a system and process for hydrocyclone separation of particulate solids and at least one liquid phase from a multiphase liquid mixture. The use of a three phase gravity separator is indicated. The fluid in the water leg from the gravity separator is a multiphase liquid and is directed first to a solid/liquid hydrocyclone and than delivered to a liquid/liquid hydrocyclone for separating the liquid stream into a heavier liquid phase and a lighter liquid phase. The gravity separator is the primary separation device.

None of the prior teachings adequately addressed or solved the problem of intercepting and removing a majority of wastewater solids prior to the wastewater entering primary treatment systems to prevent costly damage to expensive equipment.

SUMMARY OF THE INVENTION

In the method of this invention, wastewater is pumped into a low maintenance hydrocyclone to concentrate gritty solids into a smaller wastewater stream that is then passed through a screen to filter solids greater than about 100 microns in size. All of the equipment used in the pretreatment phase can be above ground and the only mechanical device necessary is the pump. Little maintenance is required.

Preferably, the method for pretreatment of an industrial wastewater stream comprising settleable solids comprises the steps of: (a) pumping wastewater from a collecting vessel though a hydrocyclone to obtain an overflow of reduced solids content and an underflow of enhanced solids content; (b) supplying the overflow to a gravity settler; (c) screening the underflow to obtain a screened water steam and screened solids; (d) supplying the screened water to the gravity settler; (e) operating the gravity settler to obtain an effluent essentially free of settleable solids and a sludge stream. Preferably, the overflow contains solids with an average size less than about 100 microns and the underflow contains solids having an average particle size greater than about 100 microns. Alternatively, the screened solids have an average particle size greater than about 50 microns. In one aspect of this invention, the screen comprises a vibrating screen with openings to retain particles more than about 50 microns in size. Alternatively, the screen comprises a fixed crossflow screen with openings to retain particles more than about 100 microns in size.

Preferably, the method of this invention further comprises the step of collecting the screened solids in a container. The overflow comprises at least 70 volume percent of the wastewater and the underflow comprises not more than 30 volume percent. In an alternative method of pretreatment of industrial wastewater, step (a) comprises pumping the wastewater to a plurality of hydrocyclones in parallel. In one aspect, where the wastewater contains oil, the gravity settler is an oil-water separator. Preferably, steps (b) and (d) comprise introducing the overflow and screened water to a forebay and from the forebay to the inlet of a corrugated plate interceptor upstream from an oil-water separator.

In the method of cleaning industrial wastewater containing settleable solids comprising passing wastewater from a sewer to a gravity settler, discharging an effluent stream from the settler essentially free of settleable solids and discharging a sludge stream from the settler, a preferred improvement comprises: (a) pumping the wastewater from the collecting vessel through a hydrocyclone to obtain an overflow of reduced solids content and an underflow of enhanced solids content; (b) supplying the overflow to a gravity settler; (c) screening the underflow to obtain a screened water stream and screened solids; (d) supplying the screened water to the gravity settler; (e) operating the gravity settler to obtain the effluent and sludge streams, wherein the sludge stream is reduced by at least 50%.

A preferred system for cleaning an industrial wastewater stream comprising settleable solids comprises a collecting vessel for collecting wastewater; a pump for withdrawing wastewater from the collecting vessel and forming a pressurized wastewater stream; a hydrocyclone for separating the pressurized wastewater stream into an overflow of reduced solid content and an underflow of enhanced solids content; a screen for removing solids from the underflow; a reservoir for collecting the overflow and the screened underflow; a gravity settler for receiving wastewater from the reservoir and separating settleable solids therefrom to form an effluent stream essentially free of settleable solids and a sludge stream. Preferably, the overflow contains solids with an average size less than about 100 microns and the underflow contains solids having an average particle size greater than about 100 microns. In this preferred system, the screened solids have an average particle size greater than about 50 microns. Preferably, a container is used for receiving the screened solids. The overflow preferably comprises at least 70 volume percent of the wastewater and the underflow comprises not more than 30 volume percent.

An alternative system comprises a plurality of the pumps, hydrocyclones and screens arranged in parallel. In another aspect of this system when the wastewater contains oil, the gravity settler is an oil-water separator. Preferably, the screen comprises a vertical non-vibrating crossflow screen with openings to retain particles more than about 100 microns in size. Alternatively, the screen comprises a vibrating screen with openings to retain particles more than about 100 microns in size. Preferably, the system having a vertical non-vibrating screen comprises a corrugated. plate interceptor upstream from the oil-water separator including a forebay comprising the reservoir for collecting the overflow and the screened underflow. Alternatively, the system having a vibrating screen comprises a corrugated plate interceptor upstream from the oil-water separator including a forebay comprising the reservoir for collecting the overflow and the screened underflow. Preferably, the method of cleaning industrial wastewater of this invention directs a periodic surge overflow from the collecting vessel to the reservoir.

DETAILED DESCRIPTION OF THE INVENTION

Figure 1:
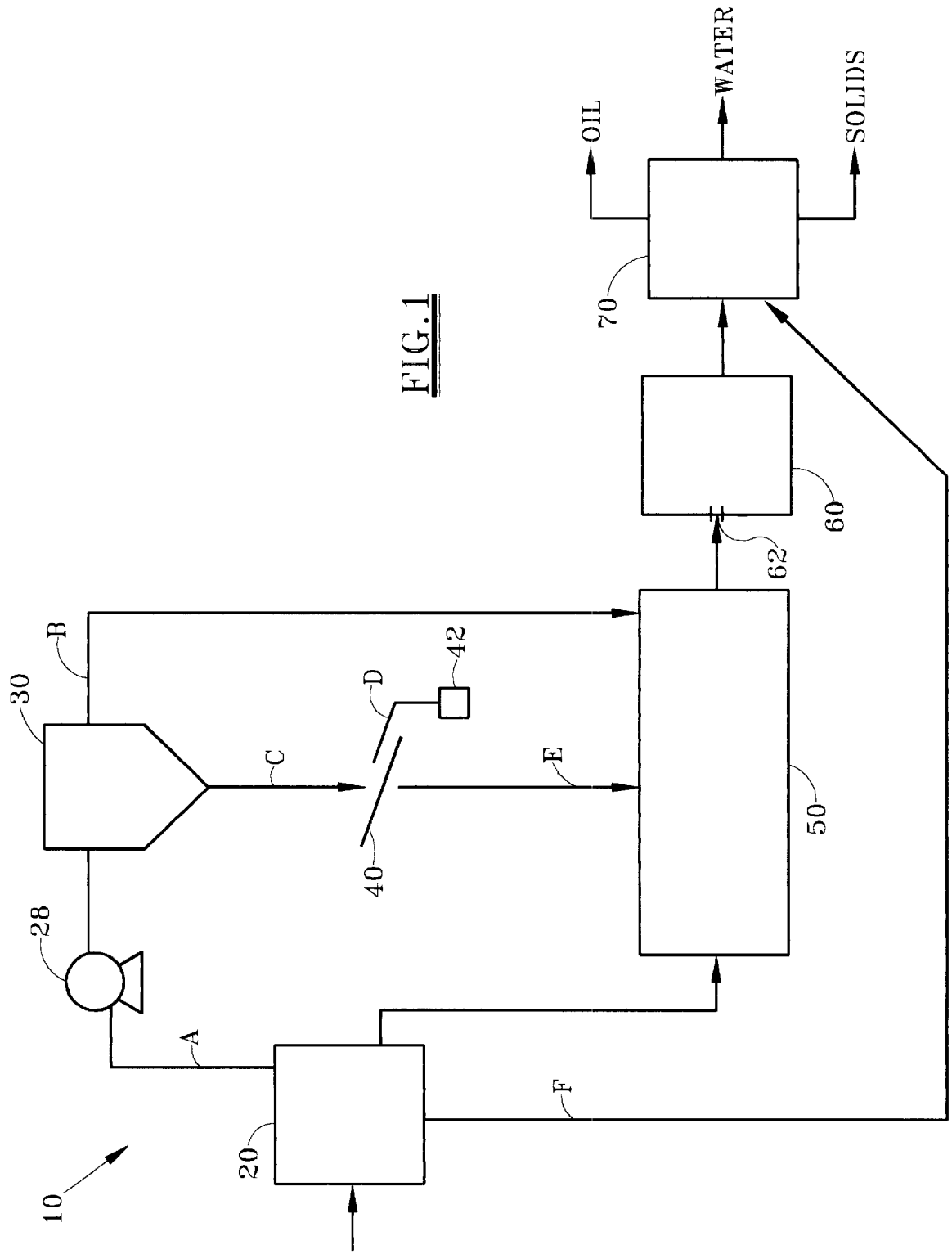
FIG. 1 is a schematic representation illustrating the industrial wastewater treatment system of the present invention.

Industrial wastewater streams from process plants such as refineries typically comprise water, suspended solids and grease or oil. The wastewater is collected in sewers for treatment prior to entering municipal sanitary sewage systems or recycled for other uses.

Referring now to the drawings, the method and system for cleaning industrial wastewater of this invention begins with pretreatment of an industrial wastewater stream to capture and remove a majority of the solids prior to the wastewater stream entering primary treatment equipment. During the pretreatment phase, a pump 28 pulls the wastewater from a collecting vessel, preferably a sewer 20, and directs it to one or more hydrocyclones 30. The hydrocyclone 30 concentrates the solids found in the pressurized wastewater stream into a separate, smaller wastewater stream C. Preferably, the smaller wastewater stream C is then passed through a screen 40 to filter solids greater than 50 microns in size. All of the equipment 28, 30, 40 used in the pretreatment phase can be above ground. Since the only mechanical device necessary is the pump 28, little maintenance is required.

Figure 2:
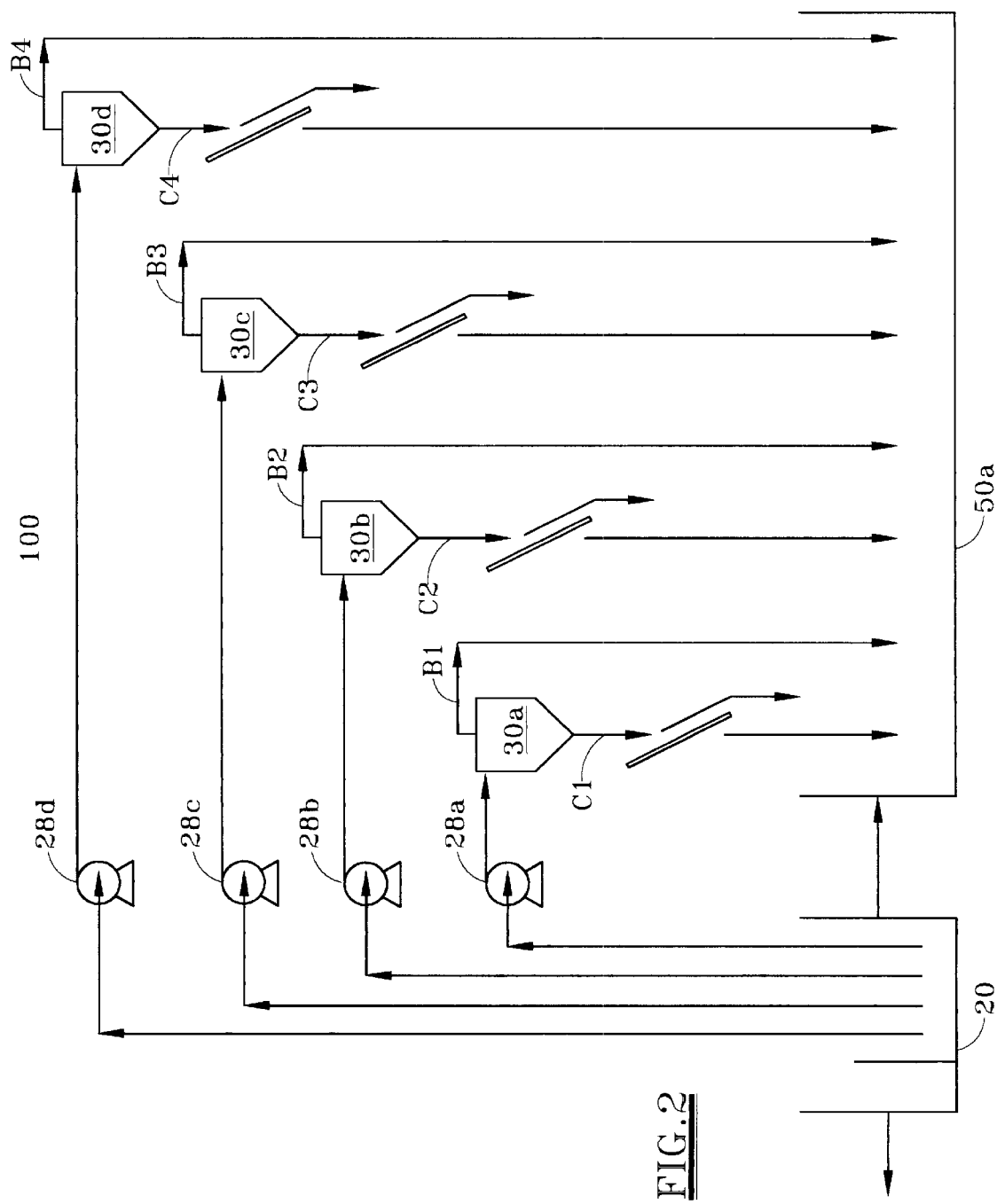
FIG. 2 is a schematic flow diagram of the method for pretreatment of industrial wastewater according to one embodiment of the present invention.

Referring to FIGS. 1 and 2, a wastewater stream is pulled from a sewer 20 and pressurized by a self-priming pump 28; alternatively multiple pumps can be used. The wastewater stream A is directed to one or more hydrocyclones 30. The hydrocyclone 30 separates the flow into two stream paths, overflow B and underflow C. Preferably, the hydrocyclone system 30 is an enclosed, flow-through system that meets Benzene-NESHAP regulations.

The overflow stream B preferably has a reduced solids content with an average size of the solids of less than 50 microns in diameter. The stream B contains approximately 95% of the water. Overflow stream B is directed via pipes to a primary cleaning system, preferably a gravity settler 60.

The underflow stream C from the hydrocyclone 30 preferably contains solids with an average size greater than 50 microns and approximately 5% of the water. The underflow C is piped to or discharged to a screen 40 for further separation of the solids. Underflow C is separated by the screen 40 into two streams E, D; a screened water stream E and a screened solids stream D. The screened solids from the solids stream D are collected in a container 42. In one embodiment, both the screened underflow water stream E and the overflow stream B are directed towards a gravity settler. The gravity settler can be a corrugated plate interceptor (CPI) system or an API (American Petroleum Institute) paddle and rake separator 70 or a combination thereof or the like. Where the wastewater contains oil, the gravity settler is an oil-water settler such as the API separator 70. Preferably the screened underflow and the overflow streams, B, E flow to a reservoir where they are collected prior to entering the gravity settlers 60, 70. Preferably the reservoir is a forebay 50 of a CPI system 60 and the overflow stream flows from the forebay 50 to an inlet 62 of the CPI system 60. In one preferred method, the screened underflow water stream E and the overflow stream B are treated first in a CPI system 60 and then in an API separator 70. The gravity settlers 60, 70 separate the settleable solids from the screened underflow and overflow streams B, E to form an effluent stream essentially free of settleable solids and one or more sludge streams. Preferably the gravity settlers 60, 70 are operated to obtain an effluent essentially free of settleable solids and a sludge stream wherein the solids content of the sludge stream is reduced at least by 50% compared to operations without the pretreatment system of the present invention.

The size of the screened solids varies from a particle size greater than 50 microns to a size greater than 150 microns depending on the type of screen used. In one embodiment, the screen 40 is a non-vibrating crossflow screen with openings to retain particles more than 100 microns in size. Alternately, the screen openings (not shown) can retain particles more than 50 microns in size. In one aspect, the non-vibrating screen 40 is a wedge wire screen with a 280 mesh. Non-vibrating screens are commonly available. One vendor for such a screen is the Kason Corporation.

Alternatively, the screen 40 is a vibrating screen preferably having a 280 mesh. This type of screen is commonly available and may be obtained at a vendor such as the Brandt Corporation. For either screen, the mesh size can vary, for example a 100 size mesh for screening solids greater than 150 microns can also be used. Preferably, the screening system is enclosed except for the solids discharge opening, which must remain open for continuous solids discharge into the container 42. This enclosed system also meets Benzene-NESHAP regulations.

Preferably, the screened water stream E flows to a CPI forebay and then to primary gravity settlers such as a CPI or an API system or both. Alternatively, the screened water stream E can flow directly to the gravity settlers 60, 70.

The flow of wastewater throughout the industrial cleaning system 10 is pressurized by one or more self-priming pumps 28 that pump the wastewater from the collecting vessel 20 or sewer through pipes to the hydrocyclone 30. Pressure drops occur as the wastewater flows through the hydrocyclone 30. Preferably, the hydrocyclone 30 is elevated so that a gravity flow system then maintains a downward flow of the wastewater streams B, C to either the screen 40 or the CPI forebay 50. Additional pumps can supplement the gravity flow throughout the industrial cleaning system or can be used in lieu of gravity flow. Preferably the pumps are self-priming pumps that produce a flow rate of at least 1500 gallons per minute (gpm). Such pumps are readily available under the tradename of Godwin Pumps. Other brand name pumps can also be used.

FIG. 2 illustrates a multi-hydrocyclone system 100. In this system 100, the collecting vessel 20 has multiple level switches (not shown). Preferably, the level switches are on/off switches. As the wastewater level reaches the first level switch, the switch is tripped to an "on" position so that the wastewater stream A is pumped by the first pump 28a to the first hydrocyclone 30a. If the wastewater flow rate to the collecting vessel 20 is greater than 1500 gpm, the wastewater will trip the second level switch so that a second pump 28b is activated producing a wastewater stream to the second hydrocyclone 30b. Increased amounts of wastewater increases the the wastewater flow rate and the wastewater flows faster and increases the level in the collecting vessel 20. Each increase in flow rate above multiples of 1500 gpm activates an additional pump 28c, 28d thereby triggering the flow of another stream to other hydrocyclones 30c, 30d. The wastewater streams are centrifuged and separated by the hydrocyclones 30a, 30b, 30c, 30d into overflows B1, B2, B3, B4 and underflows C1, C2, C3, C4. The overflows are directed to a primary treatment system such as the gravity settlers 60, 70 while the underflows C1, C2, C3, C4 are screened for the removal of additional solids prior to entering the gravity settlers 60, 70. Periodic surge flows over 6000 gpm are piped directly from the collecting vessel 20 to a holding tank for a gravity settler 50a or alternatively directly to a gravity settler 50a. If the wastewater flow swells over all level switches such as may happen during unusually heavy rain storms, the surging wastewater flows directly to a gravity settler, preferably an API separator 70.

As the wastewater flow rate subsides within the industrial cleaning system 10, the level of the wastewater in the collecting vessel 20 falls below the level switches. When the wastewater flow falls below any of the level switches, than that switch automatically moves to the off position, the action of the pump controlled by the level switch is stopped and the wastewater stream ceases.

The foregoing description is illustrative and explanatory of preferred embodiments of the invention, and variations in the size, shape, materials and other details will become apparent to those skilled in the art. It is intended that all such variations and modifications which fall within the scope or spirit of the appended claims be embraced thereby.

We claim:

1. A method for pretreatment of an industrial wastewater stream comprising settleable solids to remove the settleable solids before the stream enters a primary treatment system, the method comprising the steps of:

(a) pumping wastewater from a collecting vessel through a hydrocyclone to obtain an overflow of reduced solids content and an underflow of enhanced solids content;

(b) supplying the overflow to a mechanical gravity settler;

(c) screening the underflow to obtain a screened water stream and screened solids;

(d) supplying the screened water to the mechanical gravity settler;

(e) operating the gravity settler to obtain an effluent essentially free of settleable solids and a sludge stream;

(f) supplying the effluent to the primary treatment system.

2. The method of claim 1, wherein the overflow contains solids with an average size less than about 100 microns.

3. The method of claim 1 wherein the underflow contains solids having an average particle size greater than about 100 microns.

4. The method of claim 1 wherein the screened solids have an average particle size greater than about 50 microns.

5. The method of claim 1 wherein a screen for screening the underflow in step (c) comprises a vibrating screen with openings to retain particles more than 50 microns in size.

6. The method of claim 1 wherein the screen comprises a fixed crossflow screen with openings to retain particles more than about 100 microns in size.

7. The method of claim 1 further comprising the step of collecting the screened solids in a container.

8. The method of claim 1 wherein the overflow comprises at least 70 volume percent of the wastewater and the underflow comprises not more than 20 volume percent.

9. The method of claim 1 wherein step (a) comprises pumping the wastewater to a plurality of hydrocyclones in parallel.

10. The method of claim 1 wherein the wastewater contains oil and the mechanical gravity settler is an oil-water separator.

11. The method of claim 1 wherein the steps (b) and (d) comprise introducing the overflow and screened water to a forebay and from the forebay to the inlet of a corrugated plate interceptor upstream from a mechanical oil-water separator.

* * * * *